UNITED STATES PATENT OFFICE.

FREDERICK A. MEYER, OF BROOKLYN, NEW YORK, ASSIGNOR, BY MESNE ASSIGNMENTS, TO THE COMPOSITE CELL COMPANY, OF NEW JERSEY.

PLASTIC COMPOUND.

SPECIFICATION forming part of Letters Patent No. 393,382, dated November 27, 1888.

Application filed November 11, 1887. Serial No. 254,896. (No specimens.)

*To all whom it may concern:*

Be it known that I, FREDERICK A. MEYER, a citizen of the United States, residing at Brooklyn, in the county of Kings and State of New York, have invented certain new and useful Improvements in Plastic Compounds, of which the following is a full, clear, and exact description.

This invention is a new and improved and cheap plastic insulating substance possessing in a marked degree many of those desirable qualities which in materials of this character have only been attained at a great expense.

The composition of matter which I have described is one composed mainly of sulphur and a fibrous material, either vegetable or mineral; but for many purposes it is desirable that the quality of brittleness which such a compound possesses should be avoided as far as possible, and I have secured this result by using in conjunction with the ingredients named a certain portion of paraffine or any other waxy or similar substance which melts below the fusing-point of sulphur. The particular fibrous material which I prefer to use for this purpose is asbestus fiber. I find, however, that the cost of this compound may be greatly reduced, without impairing sensibly its insulating and other desirable qualities, by adding to it a comminuted or finely-divided mineral, such as silicious sand. This serves as a filler to make the mass more dense, while its presence enables the compound to be more readily cast or molded. The sulphur and fibrous material may be combined with an equal weight of the mineral, if so desired.

This compound may be used for a great variety of purposes. It is, for example, a very desirable material for the manufacture of battery cells or jars, and when so applying it I have found excellent results to follow from using a compound composed of the following ingredients, thoroughly mixed while hot and soft and then molded into the required form: Sulphur, one hundred parts; silicious sand, one hundred and fifty parts; asbestus fiber, fifty parts; paraffine, three to fifteen parts, the proportions being by weight. This combination of the ingredients yields a tough strong product possessing considerable flexibility, not readily susceptible to the action of acids or alkalies, and forming an excellent insulator.

The mineral or sand in this compound serving merely as a filler, which renders the mass less sticky when hot and more easy to mold, may be omitted or replaced by any other suitable insulating material that secures the same result.

With the compound may be incorporated any suitable coloring-matters. These are preferably added in a powdered state to the mass while in a semi-fluid condition. For instance, if the product is to be black, bone-black may be used.

This compound may be used as the material for a variety of other articles, among which are insulating brackets, strips, blocks, cases, boxes, and all such devices, and many of the articles which are commonly made of hard rubber or glass.

The great merit of the compound aside from that named is its cheapness, it being in this respect far ahead of glass, hard rubber, or other compounds now employed for similar purposes.

It is sufficiently soft and fluid while hot to be molded into any desired form, care being taken in molding jars and the like to provide against the tendency of the mass to shrink in cooling.

What I claim is—

1. The composition of matter herein described, consisting of sulphur, fibrous material, finely-divided mineral, and a waxy or a similar substance whose fusion-point is below that of the sulphur.

2. The composition of matter, consisting of sulphur, asbestus fiber, silicious sand, and paraffine, in substantially the proportions set forth.

FREDERICK A. MEYER.

Witnesses:
ROBT. F. GAYLORD,
FRANK B. MURPHY.